United States Patent
Alshammary

(10) Patent No.: US 12,211,273 B2
(45) Date of Patent: Jan. 28, 2025

(54) SMART OCCUPANT EMERGENCY LOCATOR AND HEADCOUNTER

(71) Applicant: Saudi Arabian Oil Company, Dhahran (SA)

(72) Inventor: Meshaal Mohammed Alshammary, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/655,109

(22) Filed: Mar. 16, 2022

(65) Prior Publication Data
US 2023/0298346 A1    Sep. 21, 2023

(51) Int. Cl.
*G06V 20/00* (2022.01)
*G06V 40/16* (2022.01)
*G08B 17/06* (2006.01)
*G08B 29/04* (2006.01)

(52) U.S. Cl.
CPC ............ *G06V 20/36* (2022.01); *G06V 40/161* (2022.01); *G06V 40/168* (2022.01); *G08B 17/06* (2013.01); *G08B 29/043* (2013.01)

(58) Field of Classification Search
CPC .... G06V 20/36; G06V 40/161; G06V 40/168; G08B 17/06; G08B 29/043
See application file for complete search history.

(56) References Cited

U.S. PATENT DOCUMENTS

| | | |
|---|---|---|
| 5,896,082 A | 4/1999 | MacFarlane |
| 8,644,792 B2 | 2/2014 | Lontka |
| 9,466,197 B2 | 10/2016 | Hildick-Pytte |
| 9,489,814 B1 | 11/2016 | Pettigrew et al. |
| 9,813,992 B2 * | 11/2017 | Peinhardt ............. G01S 5/0036 |
| 11,024,105 B1 * | 6/2021 | Brand ................ G06K 7/10366 |
| 2005/0190053 A1 | 9/2005 | Dione |
| 2011/0276264 A1 | 11/2011 | Plocher et al. |
| 2016/0300460 A1 * | 10/2016 | Kulkarni ................ G08B 17/06 |
| 2018/0365550 A1 * | 12/2018 | Brown ...................... G01V 8/20 |
| 2019/0012607 A1 * | 1/2019 | Holliday .................. G06N 7/01 |
| 2019/0295397 A1 * | 9/2019 | Eckert ...................... G08B 5/36 |
| 2021/0166539 A1 * | 6/2021 | Rodriguez ............. G08B 17/06 |
| 2023/0112743 A1 * | 4/2023 | Brown .................... H04W 4/90 |
| | | 455/404.2 |

* cited by examiner

Primary Examiner — Md K Talukder
(74) Attorney, Agent, or Firm — Fish & Richardson P.C.

(57) ABSTRACT

A method and systems for evacuating a building during an incident are provided. An exemplary method includes tracking location of personnel in the building, monitoring incident sensors, detecting an incident based, at least in part, on the incident sensors, activating alert systems, locating unevacuated personnel in the building, and displaying the location of the unevacuated personnel on a fire alarm control panel (FACP).

20 Claims, 5 Drawing Sheets

SMART OCCUPANT EMERGENCY LOCATOR AND HEADCOUNTER

TECHNICAL FIELD

The present disclosure is directed to a fire alarm control panel that includes a personnel locator and headcounter.

BACKGROUND

High-rise buildings have been a concern in the fire safety due to large number of occupants' capacity, limited emergency egress, large buildings, and multiple floors, which makes the emergency evacuation a risk factor. Current practices rely on manual headcounts after evacuation, which delays the search for victims. This also increases the risks to firefighters as they spend time in the danger zone searching for personnel trapped inside the building.

SUMMARY

An embodiment described in examples herein provides an emergency personnel locator system. The emergency personnel locator system includes a fire alarm control panel (FACP). The FACP includes a controller and incident sensors coupled to the FACP, wherein the incident sensors include a smoke detector, or a fire detector, or both. Personnel sensors are coupled to the FACP, wherein the personnel sensors include a badge detector, a motion sensor, or a pressure sensor, or any combinations thereof. Alarm systems, including a light, a sound generator, or both are coupled to the FACP. The controller includes a processor and a storage system, wherein the storage system includes instructions to direct the processor to monitor the personnel sensors to track personnel in a building, monitor the incident sensors to detect an incident, activate the alarm systems, and display a number and a location of personnel in the building on the FACP.

Another embodiment described in examples herein provides a method for evacuating a building during an incident. The method includes tracking location of personnel in the building, monitoring incident sensors, detecting an incident based, at least in part, on the incident sensors, activating alert systems, locating unevacuated personnel in the building, and displaying the location of the unevacuated personnel on a fire alarm control panel (FACP).

Another embodiment described in examples herein provides a fire alarm control panel (FACP), wherein the FACP includes a controller, wherein the controller includes a processor and a storage system. The storage system includes instructions to direct the processor to monitor personnel sensors to track personnel in a building, monitor incident sensors to detect an incident, activate alarm systems, and display a number and a location of personnel in the building on the FACP.

DETAILED DESCRIPTION

Currently, many building use a fire alarm control panel (FACP) to monitor incident sensors, such as fire detection sensors, smoke detection sensors, flooding detection sensors, and the like. Upon detecting activation of incident sensors, the FACP will activate alert systems, such as sirens, strobe lights, horns, and the like.

However, no current FACP locates occupants inside a building or can provide a count of the number of occupants at a location in a building during an emergency evacuation. Embodiments described herein upgrade the FACP with the addition of sensors that can track personnel and count the number of personnel in locations in the building. This information can be provided to emergency personnel, such as fire, police, and rescue personnel during an incident.

The sensors can include cameras with facial recognition, infrared motion sensors, laser sensors, photoelectric sensors, and pressure sensors, among others. For example, sensors can be installed in smoke detectors or alert systems located in ceilings. Other sensors may be located in ceilings, for example, above ceiling tiles or in flooring, for example, below carpet.

Figure 1:
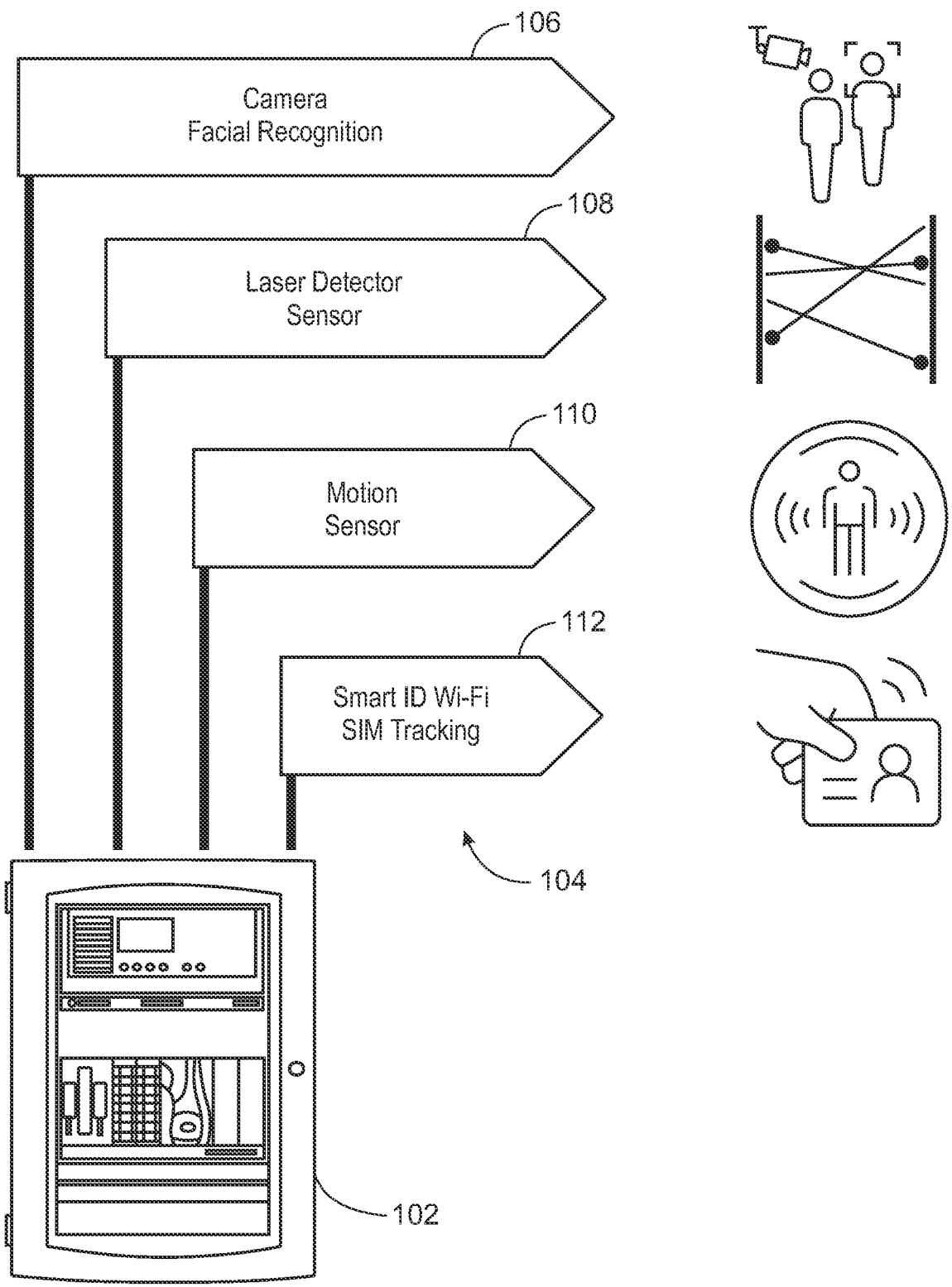
FIG. 1 is a schematic diagram of a fire alarm control panel (FACP) coupled to personnel sensors.

FIG. 1 is a schematic diagram of a fire alarm control panel (FACP) 102 coupled to personnel sensors 104. In various embodiments, the sensors 104 include a camera facial recognition system 106, a laser detector sensor 108, a motion sensor 110, and a smart ID card sensor 112. For example, the camera facial recognition systems 106 may be integrated into the FACP 102, and use camera images taken when personnel enter a building with a smart ID card for the facial recognition. Such systems are commercially available as services, for example, from Alphabet, Inc. of Mountain View, CA, USA or from GS technology LLC of Biloxi, MS, USA.

In various embodiments, the laser detector sensor 108 is a photoelectric beam sensor that is triggered by breaking the beam. For example, a reflector may be located across a protected area from the source to return the beam to a detector located in the same housing as the source. The sensor would then be triggered by stepping between the source and the reflector. Such systems are available from OPTEX America of Rancho Dominguez, CA, USA, for example, in the AX line of products.

In other embodiments, the laser detector sensor 108 is an active IR laser system, such as a LiDAR system, that scans an area, and is triggered by entry into the scanned area. Such systems are available from OPTEX America in the RED-WALL® series of products.

In various embodiments, the motion sensor 110 is a passive infrared (PIR) motion sensor, using infrared light emitted by a person to detect motion. Such sensors are available from Honeywell International, Inc. of Charlotte, NC, USA, under the DUAL TEC brand, among others.

In various embodiments, the smart ID card sensor 112 is an access control sensor that reads an RFID tag in an identification card to obtain a SIM (subscriber identification module) number associated with a person. Such sensors are available from Honeywell under the OmniClass™ brand.

As described herein, the sensors 106, 108, 110, and 112 are used by a controller in the FACP 102 to locate and count personnel in the building. This information may then be used by emergency responders to confirm evacuation of the building or locate unevacuated personnel for rescue, as described further with respect to FIG. 2.

Figure 2:
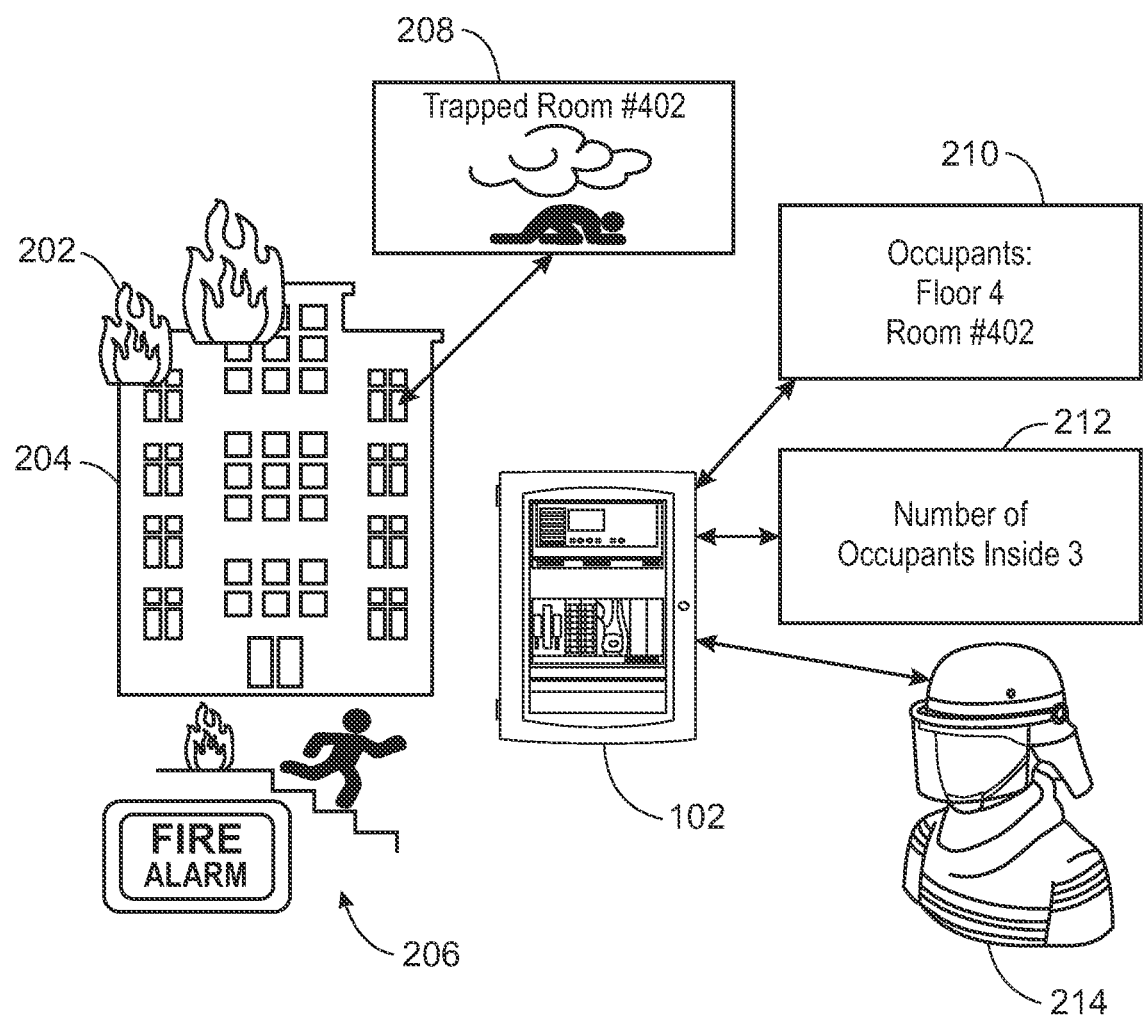
FIG. 2 is a schematic diagram of the use of an FACP, which is equipped with personnel sensors.

FIG. 2 is a schematic diagram of the use of an FACP 102, which is equipped with personnel sensors. Like numbered items are as described with respect to FIG. 1. During normal operation, the FACP 102 locates and counts the occupants of each room or zone in the building using the personnel sensors, such as those described with respect to FIG. 1.

As shown in FIG. 2, the FACP 102 detects an incident, such as a fire 202, in the building 204 and activates an emergency alert system for evacuation, such as the fire alarm 206. The FACP 102 monitors the exit of personnel, and identifies that personnel in a particular location 208 have not left that location. The FACP 102 displays the information on the unevacuated personnel on the control panel, including the location 210 and the number of occupants 212. Emergency responders 214 that are proximate to the FACP 102 can read the information off the control panel, focusing their efforts on rescuing the unevacuated personnel from the particular location 208, without needing to search the premises. In some embodiments described herein, the emergency responders 214 are provided the information 210 and 212 over a network connection, for example, allowing the emergency responders to be informed of the information 210 and 212 by radio communications.

Figure 3:
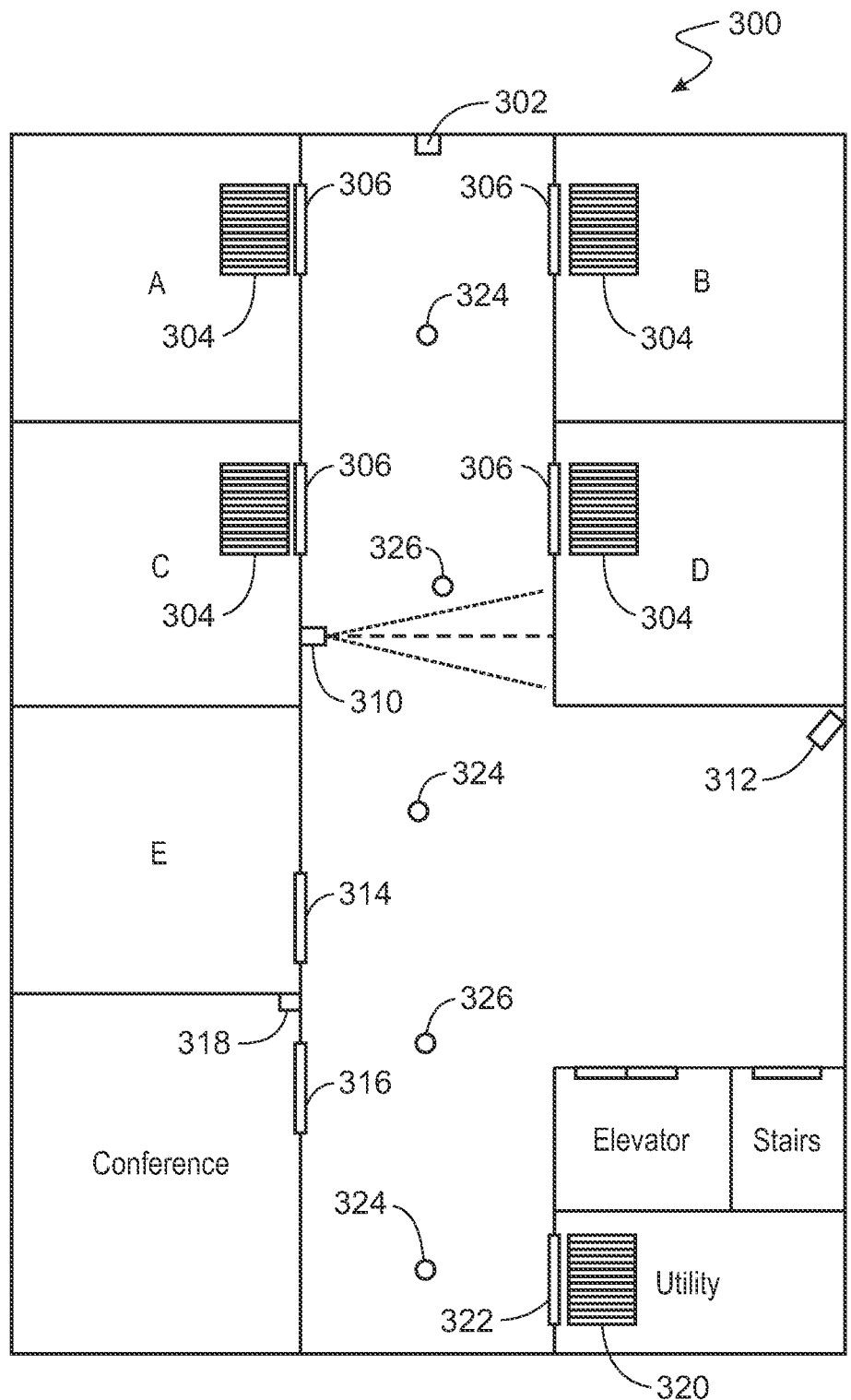
FIG. 3 is a drawing of a simplified floorplan in a building showing an example of the configuration of sensors that may be used with an FACP.

FIG. 3 is a drawing of a simplified floorplan 300 in a building showing an example of the configuration of sensors that may be used with an FACP. In this example floorplan, there are five offices, A-E, a conference room, a utility area, and elevators. It can be understood that this is merely a simplified example. In real implementations, the floorplan will likely include far more offices, as well as breakrooms, multiple conference rooms, restrooms, emergency stairs and the like.

A passive infrared (PIR) motion sensor 302 is located at the end of a hallway near offices A and B, and can be used to identify the presence of personnel moving in the hallway in front of offices A-D. Pressure mats 304 are positioned just inside the door 306 of each of these offices A to D. When combined with the input from the PIR motion sensor 306, the pressure mats 304 can be used to determine when personnel enter or exit each of the offices A-D. Further, the pressure mats 304 can be used to count the number of persons in each office A-D.

A laser detector sensor 310 is located at the entrance to the hallway. If the PIR motion sensor 302 fails, for example, due to smoke filling the hallway, the laser detector sensor 310 can be used to count the number of personnel leaving the hallway by offices A-D. This can be reported back to the FACP, which can note the number of personnel remaining in offices A-D.

A camera 312 is located in the elevator landing, across from the door 314 to office E. The camera 312 can be used to identify persons coming off the elevator or exiting the stairwell. This is performed using a facial recognition system as described herein. Further, the camera 312 can be used to determine motions and numbers of personnel within the view of the camera 312, including counting the number of personnel entering the stairwell during an incident. Accordingly, the door 314 to office E and the door 316 to the conference room do not need to have pressure mats to count the number of persons in each of these rooms.

The conference room has a smart ID card reader 318, located near the door 316. The smart ID card reader 318 can be used to log the identification and numbers of personnel entering, or leaving, the conference room. If a person entering the conference room leaves their smart ID card in their office, the camera 312 will still provide a count of the number of personnel in the conference room. Further, the smart ID card reader 318 may be combined with a PIR motion sensor to count the number of persons entering the conference room.

In this example, a utility room across from the conference room, includes a pressure mat 320 located inside the door 322. The pressure mat 320 can be used to count the number of personnel in the utility room. The camera 312 can use the count to determine that all personnel have evacuated the utility room during an incident.

In the example shown, incident sensors 324, such as combined smoke and fire detectors, are alternated with alert systems 326, such as combined strobe light and siren units, along the central axis of the floorplan 300. If one of the incident sensors 324 detects an incident, such as the presence of smoke or fire, the FACP can activate the alert systems 326 to inform personnel that they need to evacuate the premises. The locations, numbers, and identification of personnel is then used to determine if all have successfully evacuated.

The locations and counts remaining in areas can then be displayed on the FACP control panel for emergency responders to determine that persons need assistance. The numbers and locations may also be sent to emergency responders over a network connection. The identifications can be used to build rolls of those who have safely evacuated or who are still missing.

Figure 4:
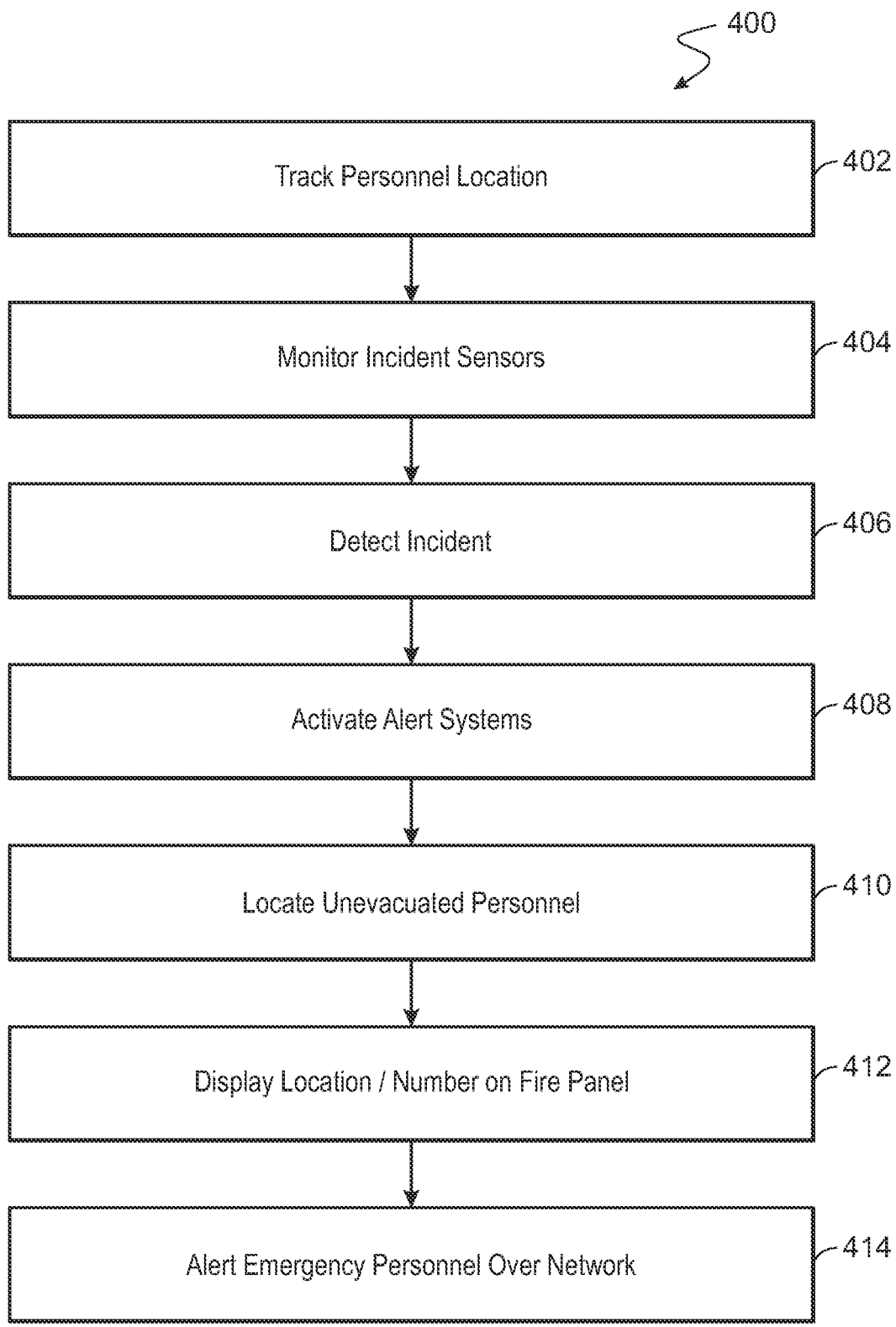
FIG. 4 is a process flow diagram of a method for using an FACP equipped with sensors to locate unevacuated personnel during an incident.

FIG. 4 is a process flow diagram of a method 400 for using an FACP equipped with sensors to locate unevacuated personnel during an incident. The method begins at block 402, with the tracking of personnel locations. This may be performed using sensors as described herein.

At block 404, incident sensors are monitored to determine if an incident has occurred. At block 406, the activation of the incident sensors are used to detect an incident, for example, the activation of smoke or fire sensors can be used to identify that a fire has started. Other incident sensors may be used in embodiments, such as water sensors in a basement level or a lower level to determine the presence of flooding that may pose a risk to personnel.

At block 408, alert systems are activated to inform personnel of the correct mitigation actions to take. For example, in a fire emergency, sirens and strobe lights are activated to inform personnel to evacuate the building. Other alerts may be issued from the FACP depending on the type of incident. For example, the detection of flooding in a basement parking level may trigger alerts to avoid or evacuate the basement levels.

At block 410, unevacuated personnel are located based on the counts and locations as determined by the sensors. At block 412, the location and number of unevacuated personnel is displayed on the control panel of the FACP. At block 414, emergency personnel are notified of the location and number of unevacuated personnel over a network connection.

Figure 5:
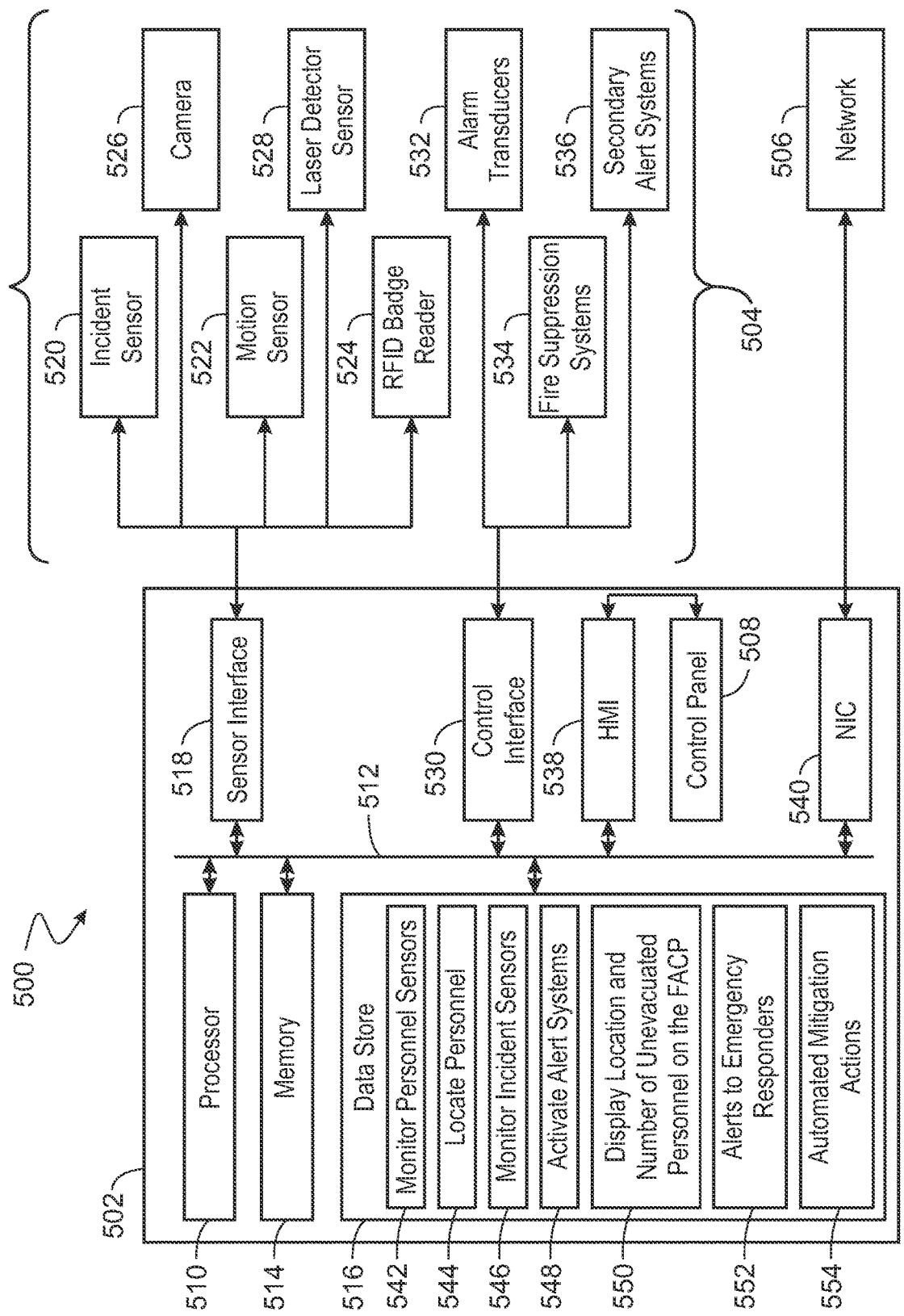
FIG. 5 is a block diagram of an FACP equipped with sensors to locate unevacuated personnel during an incident.

FIG. 5 is a block diagram of an emergency system 500 including an FACP 502 that is equipped with sensors to locate unevacuated personnel during an incident. The emergency system 500 includes the FACP 502, sensors/actuators 504, and a network 506. In some embodiments, the FACP 502 includes a microcontroller, for example, mounted in a fire resistant enclosure with a control panel 508.

The FACP 502 includes a processor 510. The processor 510 may be a microprocessor, a multi-core processor, a multithreaded processor, an ultra-low-voltage processor, or an embedded processor. In some embodiments, the processor 510 may be part of a system-on-a-chip (SoC) in which the processor 510 and the other components of the FACP 502 are formed into a single integrated electronics package. In various embodiments, the processor 510 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used.

The processor 510 may communicate with other components of the FACP 502 over a bus 512. The bus 512 may include any number of technologies, such as industry standard architecture (ISA), extended ISA (EISA), peripheral component interconnect (PCI), peripheral component interconnect extended (PCIx), PCI express (PCIe), or any number of other technologies. The bus 512 may be a proprietary bus, for example, used in an SoC based system. Other bus technologies may be used, in addition to, or instead of, the technologies above.

The bus 512 may couple the processor 510 to a memory 514. In some embodiments, the memory 514 is integrated with a data store 516 used for long-term storage of programs and data. The memory 514 include any number of volatile and nonvolatile memory devices, such as volatile random-access memory (RAM), static random-access memory (SRAM), flash memory, and the like. In smaller devices, such as PLCs, the memory 514 may include registers associated with the processor itself. The data store 516 is used for the persistent storage of information, such as data, applications, operating systems, and so forth. The data store 516 may be a nonvolatile RAM, a solid-state disk drive, or a flash drive, among others. In some embodiments, the data store 516 will include a hard disk drive, such as a micro hard disk drive, or a regular hard disk drive.

The bus 512 couples the processor 510 to a sensor interface 518. The sensor interface 518 connects the FACP 502 to the sensors used to monitor the location of personnel. In some embodiments, the sensor interface 518 is a bank of analog-to-digital converters (ADCs), a camera interface, an RFID reader, an I2C bus, a serial peripheral interface (SPI) bus, or a Fieldbus®, and the like.

In some embodiments, the sensors include an incident sensor 520, such as a smoke detector, a fire detector, or a combined smoke and fire detector. Other incident sensors may be used, including flood or water detectors, temperature detectors, and the like. In some embodiments, the sensors include a motion sensor 522, such as those described with respect to FIGS. 1-3. In some embodiments, the sensors include an RFID badge reader 524, such as those described with respect to FIGS. 1-3. In some embodiments, the sensors include a camera 526 used for facial recognition, motion and location sensing, and the like. In some embodiments, the sensors include a laser detector sensor 528, such as those described with respect to FIGS. 1-3.

The bus 512 couples the processor 510 to a control interface 530 that is used to couple the FACP 502 to controls used to inform personnel of an incident. In some embodiments, the controller interface 530 is a bank of relays, a bank of MOSFET power controllers, a serial peripheral interface (SPI), or a Fieldbus, and the like. In some embodiments, the controls include alarm transducers 532, such as sirens, strobes, and the like. In some embodiments, the controls include fire suppression systems 534, such as sprinkler systems, halon systems, carbon dioxide systems, and the like. In some embodiments, the controls include secondary alert systems 536, such as elevator alarms and deactivation systems, radio alerts, phone alerts, and the like.

The bus 512 couples the processor 510 to a human machine interface (HMI) 538. The HMI 538 couples the FACP 502 to a control panel 508 for the FACP 502. As discussed herein, the control panel 508 for the FACP 502 is co-located with the FACP 502 in a fire resistant housing, for example, in a wall of the first floor of a high-rise building.

The bus 512 couples the processor 510 to a network interface controller (NIC) 540. The NIC 540 couples the FACP 502 to a network 506, for example, including servers located in a protected environment, such as a remote location, or a fire resistant room or enclosure. The network 506 can couple to servers that provide information for emergency personnel, broadcast alerts directly to telecommunication devices, and the like.

The data store 516 includes blocks of stored instructions that, when executed, direct the processor 510 to implement the functions of the FACP 502. The data store 514 includes a block 542 of instructions to direct the processor 510 to monitor the personnel sensors, such as sensors 522, 524, 526, and 528, to sense the presence and determine the identity of personnel in the building.

The data store 516 includes a block 544 of instructions to direct the processor 510 to locate and count personnel using the information from block 542. For example, block 544 will direct the processor to determine the number of persons in a single location in the building, and, if possible, identify those persons based on location, RFID information, and facial recognition.

The data store 516 also includes a block 546 of instructions to direct the processor 510 to monitor the incident sensor 520. The information is used to determine the onset of an incident, such as a fire, chemical release, or flooding condition, among others.

The data store 516 includes a block 548 of instructions to direct the processor 510 to activate alert systems to inform personnel of the incident, and the actions to be taken. For example, the block 548 of instructions may direct the processor 510 to activate the alarm transducers 532 or secondary alert systems 536.

The data store 516 also includes a block 550 of instructions to direct the processor 510 to display the location and number of unevacuated personnel on the control panel 508 of the FACP 502. The information may be alternated with the identification information of the personnel, or the emergency responders may use the control panel 508 of the FACP 502 to bring up the identification information of the personnel.

The data store 516 may also include a block 552 of instructions to direct the processor 510 to send alerts to emergency responders. For example, the alerts may be sent through the secondary alert systems 536, for over the network 506, or both. The alerts may include the location and number of unevacuated personnel in the building, as well as the identification of the personnel.

The data store 516 may also include a block 554 of instructions to direct the processor 510 to activate automated mitigation systems, such as fire suppression systems 534.

EMBODIMENTS

An embodiment described in examples herein provides an emergency personnel locator system. The emergency personnel locator system includes a fire alarm control panel (FACP). The FACP includes a controller and incident sensors coupled to the FACP, wherein the incident sensors include a smoke detector, or a fire detector, or both. Personnel sensors are coupled to the FACP, wherein the personnel sensors include a badge detector, a motion sensor, or a pressure sensor, or any combinations thereof. Alarm systems, including a light, a sound generator, or both are coupled to the FACP. The controller includes a processor and a storage system, wherein the storage system includes instructions to direct the processor to monitor the personnel sensors to track personnel in a building, monitor the incident sensors to detect an incident, activate the alarm systems, and display a number and a location of personnel in the building on the FACP.

In an aspect, the emergency personnel locator system includes a facial recognition system, and the storage system includes instructions to direct the processor to identify personnel based, at least in part, on the facial recognition system.

In an aspect, the badge detector includes a radio frequency identification system. In an aspect, the badge detector includes a card reader. In an aspect, the card reader is at an entrance to an elevator.

In an aspect, the motion sensor includes an infrared motion detector. In an aspect, the motion sensor includes a camera.

In an aspect, the pressure sensor includes a floor mat.

In an aspect, the storage system includes instructions to direct the processor to identify individuals. In an aspect, the storage system includes instructions to direct the processor to locate individuals in the building. In an aspect, the storage system includes instructions to direct the processor to keep a count of individuals in each location in the building.

In an aspect, the controller includes a network connection and the storage system includes instructions to direct the processor to send alerts to emergency personnel over the network.

In an aspect, the controller includes a network connection and the storage system includes instructions to direct the processor to access external data sources to identify individuals.

Another embodiment described in examples herein provides a method for evacuating a building during an incident. The method includes tracking location of personnel in the building, monitoring incident sensors, detecting an incident based, at least in part, on the incident sensors, activating alert systems, locating unevacuated personnel in the building, and displaying the location of the unevacuated personnel on a fire alarm control panel (FACP).

In an aspect, the method includes identifying personnel in the building through facial recognition.

In an aspect, the method includes tracking the location of personnel in the building with motion sensors. In an aspect, the method includes tracking the location of personnel in the building with radiofrequency identification (RFID) cards. In an aspect, the method includes tracking the location of personnel in the building with pressure sensors.

In an aspect, the method includes monitoring the incident sensors for detection of smoke, fire, or both. In an aspect, the method includes activating sirens, strobe lights, or both. In an aspect, the method includes displaying a count of unevacuated personnel on the FACP.

Another embodiment described in examples herein provides a fire alarm control panel (FACP), wherein the FACP includes a controller, wherein the controller includes a processor and a storage system. The storage system includes instructions to direct the processor to monitor personnel sensors to track personnel in a building, monitor incident sensors to detect an incident, activate alarm systems, and display a number and a location of personnel in the building on the FACP.

In an aspect, the storage system includes instructions to direct the processor to send alerts to emergency personnel over a network connection, wherein the alerts include the number and the location of personnel in the building.

In an aspect, the storage system includes instructions to direct the processor to track evacuation of personnel from the building during the incident.

Other implementations are also within the scope of the following claims.

What is claimed is:

1. An emergency personnel locator system comprising:
a modified fire alarm control panel (FACP), wherein the modified FACP comprises a controller and an integrated display;
incident sensors coupled to the modified FACP, wherein the incident sensors comprise a smoke detector, or a fire detector, or both;
personnel sensors coupled to the modified FACP, wherein the personnel sensors comprise a badge detector, a motion sensor, and a pressure sensor; and
alarm systems, comprising a light, a sound generator, or both;
wherein the controller comprises a processor and a storage system, wherein the storage system comprises instructions to direct the processor to:
monitor the personnel sensors to track personnel in a building comprising a plurality of areas;
using information sensed by each of the badge detector, the motion sensor and the pressure sensor, count a number of individuals in each area of the plurality of areas in the building;
monitor the incident sensors to detect an incident;
activate the alarm systems; and
display a number and a location of individuals in each area of the plurality of areas in the building on the integrated display of the modified FACP.

2. The emergency personnel locator system of claim 1, comprising a facial recognition system, and wherein the storage system comprises instructions to direct the processor to identify personnel based, at least in part, on the facial recognition system.

3. The emergency personnel locator system of claim 1, wherein the badge detector comprises a radio frequency identification system.

4. The emergency personnel locator system of claim 1, wherein the badge detector comprises a card reader.

5. The emergency personnel locator system of claim 4, wherein the card reader is at an entrance to an elevator.

6. The emergency personnel locator system of claim 1, wherein the motion sensor comprises an infrared motion detector.

7. The emergency personnel locator system of claim 1, wherein the motion sensor comprises a camera.

8. The emergency personnel locator system of claim 1, wherein the pressure sensor comprises a floor mat.

9. The emergency personnel locator system of claim 1, wherein the storage system comprises instructions to direct the processor to identify the individuals.

10. The emergency personnel locator system of claim 1, wherein the storage system comprises instructions to direct the processor to locate the individuals in the building.

11. The emergency personnel locator system of claim 1, wherein the storage system comprises instructions to direct the processor to keep a count of the individuals in each location in the building.

12. The emergency personnel locator system of claim 1, wherein the controller comprises a network connection, and the storage system comprises instructions to direct the processor to send alerts to emergency personnel over the network.

13. The emergency personnel locator system of claim 1, wherein the controller comprises a network connection, and the storage system comprises instructions to direct the processor to access external data sources to identify the individuals.

14. A method for evacuating a building during an incident, comprising:
    using facial recognition, motion sensors, radiofrequency identification (RFID) cards and pressure sensors, maintaining a count of a number of individuals in each area of a plurality of areas in the building;
    tracking location of personnel in the building;
    monitoring incident sensors;
    detecting an incident based, at least in part, on the incident sensors;
    activating alert systems;
    locating unevacuated personnel in the building;
    displaying the location the unevacuated personnel on an integrated display on a modified fire alarm control panel (FACP); and
    displaying the number of individuals in each area of the plurality of areas in the building on the modified FACP.

15. The method of claim 14, comprising identifying personnel in the building through the facial recognition.

16. The method of claim 14, further comprising tracking the location of personnel in the building with the motion sensors.

17. The method of claim 14, further comprising tracking the location of personnel in the building with the radiofrequency identification (RFID) cards.

18. The method of claim 14, comprising tracking the location of personnel in the building with the pressure sensors.

19. The method of claim 14, comprising monitoring the incident sensors for detection of smoke, fire, or both.

20. The method of claim 14, comprising activating sirens, strobe lights, or both.

\* \* \* \* \*

UNITED STATES PATENT AND TRADEMARK OFFICE
CERTIFICATE OF CORRECTION

| | | |
|---|---|---|
| PATENT NO. | : 12,211,273 B2 | Page 1 of 1 |
| APPLICATION NO. | : 17/655109 | |
| DATED | : January 28, 2025 | |
| INVENTOR(S) | : Meshaal Mohammed Alshammary | |

It is certified that error appears in the above-identified patent and that said Letters Patent is hereby corrected as shown below:

In the Claims

In Column 10, Line 3, Claim 14, please replace "location" with -- location of --.

Signed and Sealed this
Second Day of September, 2025

Coke Morgan Stewart
*Acting Director of the United States Patent and Trademark Office*